US 6,679,669 B2

(12) United States Patent
Masa

(10) Patent No.: US 6,679,669 B2
(45) Date of Patent: Jan. 20, 2004

(54) FASTENER FOR WOOD HAVING LOCKING PORTION

(75) Inventor: James R. Masa, Elmhurst, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/894,444

(22) Filed: Jun. 28, 2001

(65) Prior Publication Data
US 2003/0002953 A1 Jan. 2, 2003

(51) Int. Cl.⁷ ................................. F16B 15/00
(52) U.S. Cl. .................. 411/478; 411/451.1; 411/456
(58) Field of Search ................ 411/477, 478, 411/462, 463, 464, 451.1, 456

(56) References Cited

U.S. PATENT DOCUMENTS

| | | | |
|---|---|---|---|
| 141,810 A | | 8/1873 | Nichols |
| 266,511 A | * | 10/1882 | Perkins |
| 412,981 A | | 10/1889 | Sanford |
| 586,989 A | * | 7/1897 | Bryany |
| 1,095,683 A | * | 5/1914 | Stambach |
| 1,208,255 A | | 12/1916 | Williams |
| 1,264,948 A | * | 5/1918 | Lindberg |
| 1,429,200 A | | 9/1922 | Fotacos |
| 1,548,456 A | * | 8/1925 | Goodman |
| 2,134,765 A | | 11/1938 | Putnam |
| 2,155,893 A | * | 4/1939 | Fulton |
| 2,156,682 A | | 5/1939 | Dimoush |
| 2,287,964 A | * | 6/1942 | Beegle |
| 2,300,767 A | | 11/1942 | Beegle |
| 2,377,169 A | | 5/1945 | Mohr |
| 2,754,716 A | | 7/1956 | Bourns |
| 2,913,204 A | | 11/1959 | Stewart |
| 3,198,057 A | | 8/1965 | Moore |
| 3,352,191 A | * | 11/1967 | Crawford |
| 3,627,362 A | | 12/1971 | Brenneman |
| 4,167,885 A | | 9/1979 | Paskert et al. |
| 4,514,126 A | | 4/1985 | Knowles |
| 4,681,498 A | | 7/1987 | Raffoni |
| 4,718,804 A | | 1/1988 | Cassese |
| 4,925,352 A | * | 5/1990 | Sundberg |
| 5,193,959 A | | 3/1993 | Motta |
| 5,261,760 A | | 11/1993 | Castonguay et al. |
| 5,333,979 A | | 8/1994 | Raffoni |
| 5,336,038 A | | 8/1994 | Raffoni |
| 5,441,373 A | * | 8/1995 | Kish |
| 5,704,751 A | | 1/1998 | Kozyrski et al. |
| 5,758,812 A | | 6/1998 | Raffoni |

FOREIGN PATENT DOCUMENTS

FR        1245130        *  9/1960

* cited by examiner

Primary Examiner—Flemming Saether
(74) Attorney, Agent, or Firm—Lisa M. Soltis; Mark W. Croll; Donald J. Breh

(57) ABSTRACT

Various embodiments of improved fasteners for joining at least two pieces of wood are disclosed. The fastener includes a plate-like member or folded rectangular member defined between a leading edge and a trailing edge. The leading edge is configured to enter the wood pieces before the trailing edge. The fastener may also include at least two corrugations formed on the plate-like member, extending in a generally longitudinal direction. The fastener includes a locking portion, having one or more projections, an adhesive, or a non-corrugated section, disposed on the plate-like member or folded rectangular member near the trailing edge, for locking the fastener within the wood pieces.

29 Claims, 3 Drawing Sheets

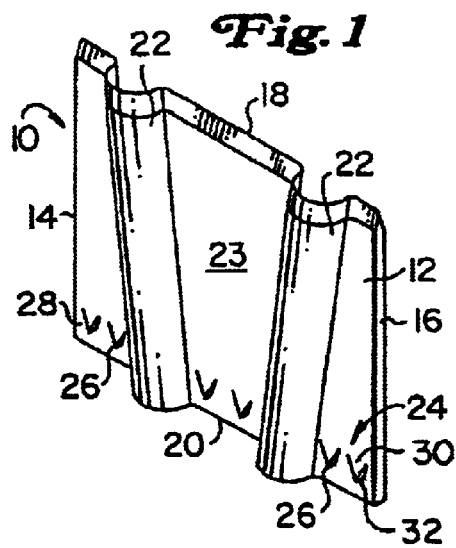
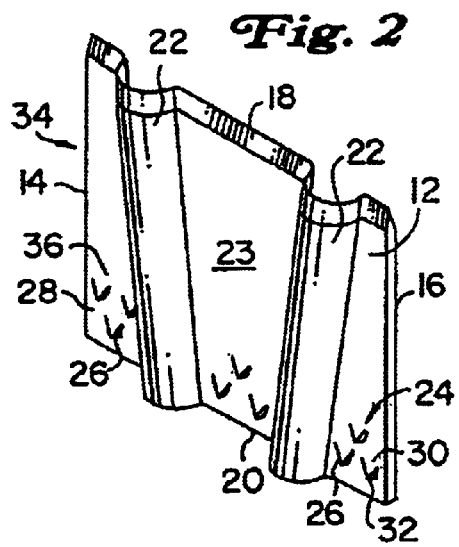
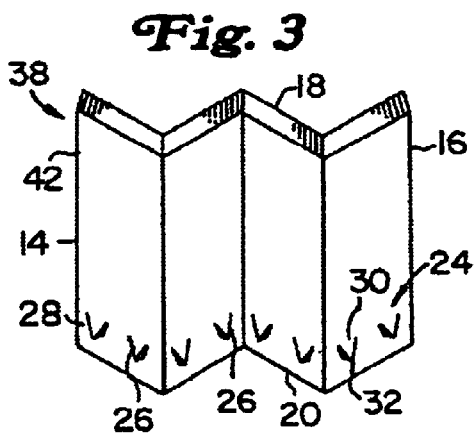
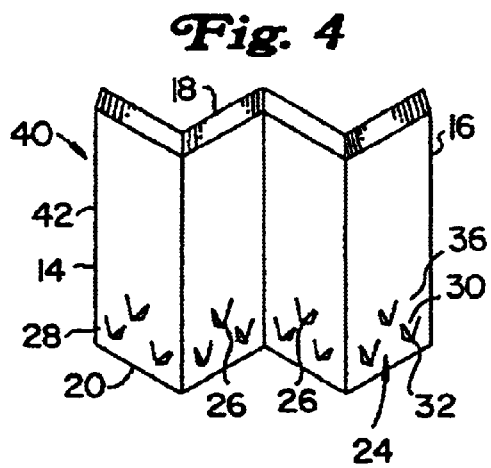
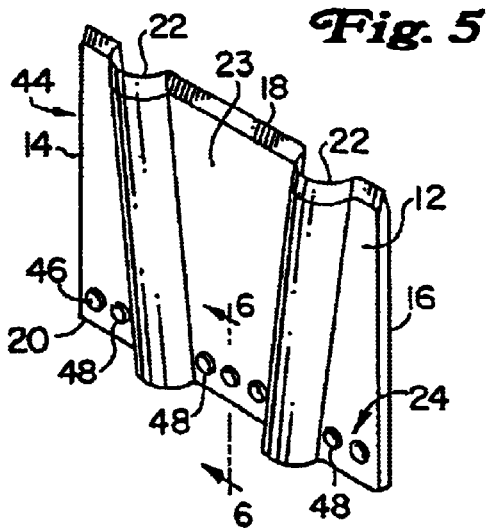
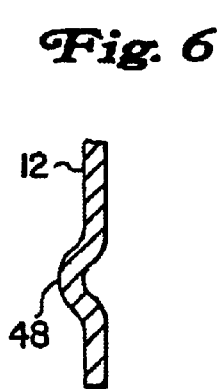

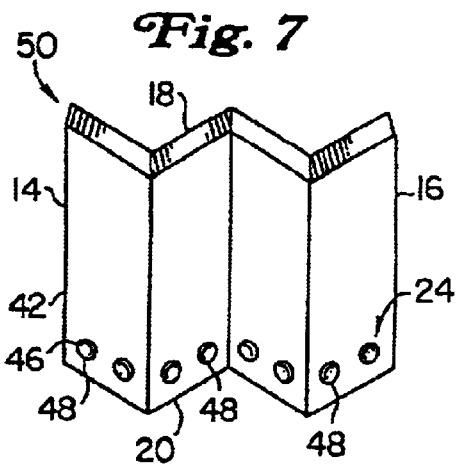
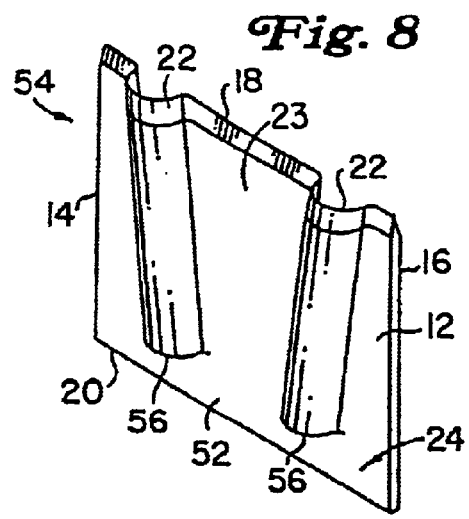
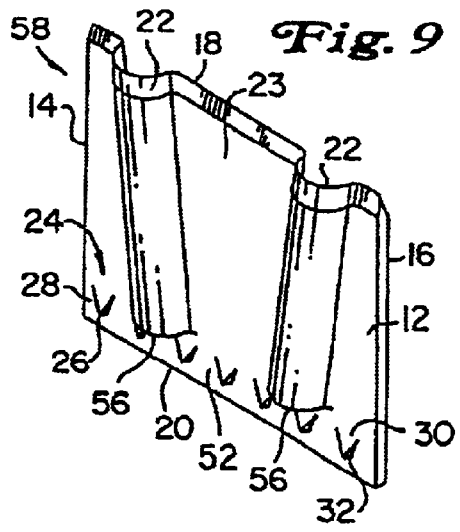
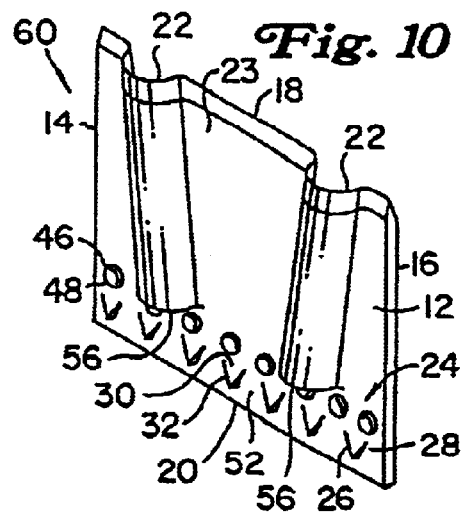
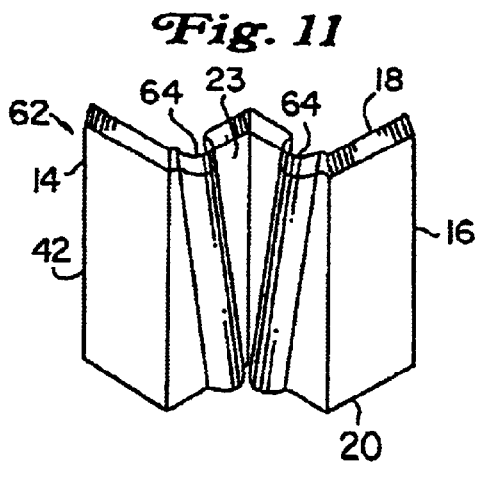
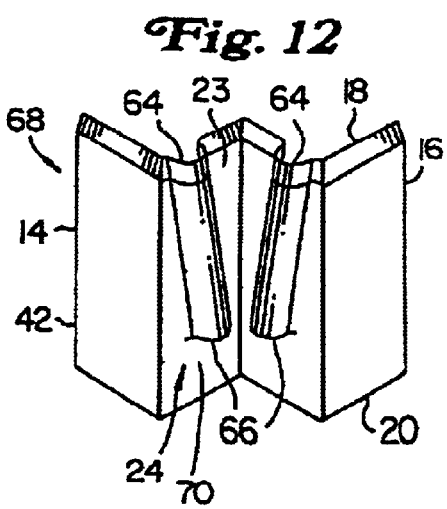

FASTENER FOR WOOD HAVING LOCKING PORTION

BACKGROUND OF THE INVENTION

The present invention relates generally to fasteners for joining wood pieces, and more particularly to an improved fastener that securely locks into place within a pair of joined wood pieces to substantially prevent undesired shifting or separation of the joined wood pieces, such as, for example, in securing components of a wooden picture frame.

Conventional fasteners for joining a number of wood pieces are typically made from metal and may contain a substantially planar section having portions that enter each of the number of wood pieces to prevent the wood pieces from separating from one another. The ends of the wood pieces may be positioned relative to one another to form various types of joints (miter joints, for example). Some existing metal fasteners, such as V-nails, are folded at portions along their planar section to improve their strength and stability during driving.

To further improve the strength and stability of a joint, prior art metal fasteners may include one or more corrugations. These corrugations may be angled with respect to ends of the metal fastener to draw the wood pieces together as they are joined, reducing separation of the wood pieces.

U.S. Pat. No. 4,514,126 to Knowles discloses a corrugated staple having first and second pairs of angled corrugations extending the full height of the staple, from a trailing edge to a leading edge. A third pair of corrugations runs parallel to the trailing edge and leading edge. Notches on the sides of the staple facilitate handling and shipment of the staple.

U.S. Pat. No. 2,156,682 to Dimoush discloses a metal fastener having a sheet-like metal body formed of flat or curvilinear, transverse corrugations extending from an upper driving edge to a lower sharpened, serrated entering edge. Grooves within the corrugations contain lateral projections to help secure the joint formed by the wood pieces and the metal fastener.

U.S. Pat. No. 2,377,169 to Mohr discloses a corrugated metal fastener having a number of vertically spaced barbs projecting outwardly from each end and from an apex of the corrugations. The triangle-shaped barbs project upwardly (towards the driving edge) and outwardly for biting into wood pieces after the corrugated metal fastener has been driven.

While these and other prior art metal fasteners help increase maintenance of a joint, they do not sufficiently address the problem of inadvertent shifting of the metal fastener within the wood pieces to be joined, particularly when the ends of the pieces are joined at an angle to one another (such as with a miter joint). If the wood pieces are shifted (during transport, for example), or if the wood flexes (due to shrinking, expanding, warping, for example) the metal fastener has a tendency to loosen from within the wood. This in turn loosens the joint, causing additional shifting of the wood pieces, which adds to the problem. Also, the prior art fasteners may damage the wood fibers to a greater extent than the present invention as they are driven into the wood pieces.

Accordingly, one object of the present invention is to provide an improved fastener that is less likely to undesirably shift from within a joint than prior art fasteners.

A further object of the present invention is to provide an improved fastener that is easy to manufacture.

A still further object of the present invention is to provide an improved fastener that enables tighter locking than previous fasteners, yet is not substantially more difficult to drive and minimizes damage to wood fibers.

Yet another object of the present invention is to provide an improved fastener that is dimensioned substantially similarly to typical fasteners, to allow a wide variety of applications.

SUMMARY OF THE INVENTION

These and other objects are met or exceeded by providing an improved fastener for joining at least two wood pieces, the fastener having a plate-like member defined between a leading edge and a trailing edge. The leading edge is configured to enter the wood pieces before the trailing edge. In one principal type of embodiment, the fastener also includes at least two corrugations formed on the plate-like member, extending in a generally longitudinal direction, and a locking portion disposed on the plate-like member near the trailing edge for locking the fastener within the wood pieces. A longitudinal direction is defined as the direction extending from the leading edge toward the trailing edge.

By providing this locking portion near the trailing edge, or drive end, of the plate-like member, the fastener can be driven substantially as easily as with prior art devices. However, after the corrugations have drawn the wood pieces together, and as the trailing edge is driven into the wood pieces to be joined, the locking portion is compressed by the wood pieces. This locks the wood pieces while they are tightly drawn together, thus locking the fastener within the joint, and more securely holding the wood pieces together, even during shifting or flexing of the wood pieces.

The locking portion preferably includes one or more rows of projections such as, but not limited to, barbs and dimpled projections. If more than one row of projections is utilized, the projections may be staggered among the rows. The corrugations may be straight or angled with respect to sides of the plate-like member.

An alternate locking portion includes a non-corrugated section near the trailing edge, defined by trailing outer ends of corrugations that extend from the leading edge towards the trailing edge, but terminate longitudinally short of the trailing edge so that an area is created for the non-corrugated section longitudinally between the trailing outer ends of the corrugations and the trailing edge. This enables the wood pieces to compress around the non-corrugated section and the trailing outer ends of the corrugations, to further secure the fastener. The non-corrugated section may contain barbs and/or dimpled projections, and these may be arranged in rows and/or staggered.

Instead of a plate-like member typical with a corrugated nail, the present invention also contemplates a fastener such as an improved V-nail having a folded rectangular section and a locking portion. In addition, the V-nail may include one or more corrugations similar to that of a corrugated fastener, and the corrugations may extend longitudinally to the trailing edge or terminate short of the trailing edge to create a non-corrugated portion.

BRIEF DESCRIPTION OF THE DRAWINGS

FIG. 1 is a perspective view of a corrugated fastener having a single row of barbs according to one type of embodiment of the present invention;

FIG. 2 is a perspective view of a corrugated fastener having two staggered rows of barbs;

FIG. 3 is a perspective view of a V-nail having a single row of barbs;

FIG. 4 is a perspective view of a V-nail having two staggered rows of barbs;

FIG. 5 is a perspective view of a corrugated fastener having a single row of projections;

FIG. 6 is a cross-sectional view showing a projection from the corrugated fastener of FIG. 5, taken along line 6—6 and in the direction indicated;

FIG. 7 is a perspective view of a V-nail having a single row of projections;

FIG. 8 is a perspective view of a corrugated fastener with a flat portion at a drive end, according to a second type of embodiment of the present invention;

FIG. 9 is a perspective view of a corrugated fastener with a flat portion having a single row of barbs, according to a third type of embodiment of the present invention;

FIG. 10 is a perspective view of a corrugated fastener with a flat portion having staggered rows of barbs and projections;

FIG. 11 is a perspective view of a V-nail having corrugations, according to a fourth type of embodiment of the present invention;

FIG. 12 is a perspective view of a V-nail having corrugations and a flat portion;

DETAILED DESCRIPTION OF THE PREFERRED EMBODIMENTS

Figure 13:
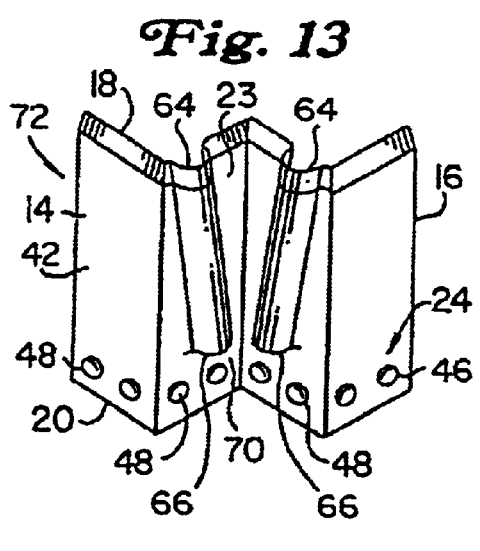
FIG. 13 is a perspective view of a V-nail having corrugations and a flat portion, with a single row of projections.

A first principal type of embodiment of the present invention is shown by example in FIGS. 1–7. The present fastener is especially suited for joining two adjacent pieces of wood, such as members of a picture frame. Naturally, other such joining applications are contemplated as is known in the art. Also, the present fastener is especially suited for use in automatic picture frame assembly machines or other fastener driving machines, or for being driven by hand.

As shown in the embodiment of FIG. 1, a first fastener 10 includes a preferably metal and generally rectangular plate-like member 12 with first 14 and second 16 lateral edges. The plate-like member 12 has a leading edge 18, or entry end, extending laterally across the plate-like member for entry into portions of a pair of wood pieces (not shown) to be joined. Preferably, the leading edge 18 is beveled or sharpened to facilitate entry of the first fastener 10 into the wood pieces. A trailing edge 20, or drive end, extends laterally across an opposite edge of the plate-like member 12 from the leading edge 18. In a preferred embodiment, two or more corrugations 22 extend in a substantially longitudinal direction from the leading edge 18 to the trailing edge 20. The corrugations 22 may be straight or curvilinear, and may be angled with respect to the lateral edges 14, 16 so that an area 23 between the corrugations is tapered as it approaches the trailing edge 20.

Near the trailing edge 20, the first fastener 10 is configured to include a locking portion, generally designated 24, for securing the first fastener into the wood pieces after being driven. The term "locking portion" is intended to include a section of the fastener 10 modified to help lock the fastener within the wood pieces being joined together. Methods of locking may include, but are not limited to, compression of the wood pieces around the locking portion, expansion of the wood pieces into the locking portion, adhesion between the locking portion and the wood pieces, or the like. As used herein, the phrase "near the trailing edge" refers to the intention that the locking portion 24 be longitudinally closer to the trailing edge 20 than to the leading edge 18. More particularly, it is preferred that the locking portion 24 be longitudinally disposed in a lower third of the fastener 10 towards the trailing edge 20 and most preferably in a lower eighth of the fastener.

The locking portion 24 of the first fastener 10 includes a series of projections, such as barbs 26, disposed laterally across the first fastener to form a row 28 of barbs. Preferably formed by partially cutting and punching out sections of the metal plate-like member 12, the barbs 26 are formed in the plate-like member at a base 30, and preferably extend outwardly and downwardly toward the trailing edge 20 while narrowing to a point 32, so that the barbs form a V-shape (when oriented as shown in FIG. 1). Alternatively, the barbs 26 may be oriented in various other directions. The barbs 24 allow the wood pieces to smoothly pass over the fastener 10 as the fastener is driven into the wood pieces, minimizing damage to the wood, but restrict movement of the fastener in the opposite direction as the wood pieces compress around the barbs.

While a locking portion 24 having a single row 28 of barbs 26 is shown in FIG. 1, other embodiments are contemplated. FIG. 2 shows a second fastener 34 having the row 28 of barbs 26, plus a second row 36 of barbs, arranged in a staggered formation relative to one another. The barbs 26 may, but need not, alternate between the row 28 of barbs and the second row 36 of barbs across the locking portion 24. In addition to the rows 28, 36 of barbs 26 on the locking portion 24, it is contemplated that other barbs or projections may be arranged on the remainder of the surface of the fastener 10.

The locking portion 24 may also be formed on alternate types of fasteners. For example, a third fastener 38 and a fourth fastener 40, both V-nails, are shown in FIGS. 3 and 4, respectively, each containing folded rectangular members 42 preferably having a generally W-shaped profile. The folded rectangular members 42 include locking portions 24 containing the row 28 of barbs 26 (seen in FIG. 3), or both the row of barbs and the second row 36 of barbs, staggered relative to one another (seen in FIG. 4).

Additional or alternative types or configurations of projections for the locking portions 24 are contemplated as well. The term "projections" is intended to generally encompass any structure projecting from the fastener 10 which creates additional pressure and/or friction with the surrounding wood pieces to help prevent shifting of the fastener 10. FIG. 5 shows a fifth fastener 44 with a locking portion 24 having a single row 46 of dimpled projections 48. The dimpled projections 48 are preferably rounded, and are preferably formed by indenting sections of the plate-like member 12, without punching completely through the surface of the sections, as seen in the dimpled projection of FIG. 6. FIG. 7 shows a sixth fastener 50 which is a V-nail having a row 46 of dimpled projections 48. Many other variations, configurations, and arrangements of projections are contemplated by the present invention. Instead of, or in addition to, the projections, adhesives (glue, e.g.) applied to the locking portion 24 may be used to secure a connection with the wood pieces. In this alternative embodiment, the frictional force of the fastener 10 while being driven may at least partially melt the adhesive, which then solidifies after the fastener is inserted, adhering to portions of the wood pieces as well to secure a connection.

In operation, by disposing the locking portion 24 containing the dimpled projections 48 or the barbs 26 near the trailing edge 20 of the fastener 10, 34, 38, 40, 44 (collectively referred to as "the fastener 10") the fastener is driven into the wood pieces (in a miter joint, for example) from the leading edge 18 with typical resistance, and with minimal damage to the wood fibers. The corrugations 22 (if a corrugated fastener) or folded rectangular members 42 (if a V-nail) draw the wood pieces together. At or near a maximum point of tightness of the joint, near the end of the driving process, the barbs 26 and/or the dimpled projections 48 of the locking portion 24 enter the wood pieces. The wood pieces contact the dimpled projections 48 or barbs 26 of the locking portion, and at least partially compress around them. The fastener 10 is thus locked as it is driven into the wood pieces. Even if the wood pieces forming the joint later shift with time, the fastener 10 remains locked into the wood pieces because the wood pieces are locked at a point where they are tightly drawn together. If the wood pieces later expand or flex, the wood should continue to compress at least a portion of the locking section 24, further hindering shifting of the fastener 10. This helps secure the connection of the wood pieces to be joined, and helps prevent undesired loosening of the joint.

Referring now to FIG. 8, showing an example of a second principal type of embodiment of the present invention, the locking portion 24 includes a non-corrugated section 52 at or near the trailing edge 20. As shown by example in the seventh fastener 54 of FIG. 8, the corrugations 22 extend from the leading edge 18 down toward the trailing edge 20, but terminate short of the trailing edge at a pair of trailing outer ends 56, thus defining the non-corrugated section 52 between the pair of trailing outer ends of the corrugations and the trailing edge. The term "trailing outer ends" is intended to indicate the outer ends of the corrugations 22 that are closer to the trailing edge 20 (the lower ends, as shown in FIG. 8). This non-corrugated section 52 may be a flat portion extending across the plate-like member 12, between the first and second lateral edges 14, 16, as shown in the seventh fastener 54 of FIG. 8. Alternatively, the non-corrugated section 52 may include one or more rows of projections, such as the row 28 of barbs 26 shown in the eighth fastener 58 of FIG. 9, or the row of barbs and the row 46 of dimpled projections 48 shown staggered from one another in the ninth fastener 60 of FIG. 10.

By placing the non-corrugated section 52 at or near the trailing edge 20 of the plate-like member 12, the preferably angled corrugations 22 draw the wood pieces together. The trailing edge 20 is driven into the joint, and the wood pieces, while being tightly drawn together, compress both the trailing outer ends 56 of the corrugations 22 and the portion of the plate-like member 12 forming the non-corrugated section 52, to more securely lock the fastener 54 in place. Preferably, while being joined, the wood pieces are deformed substantially only by the corrugations 22 and the sharp leading edge 18 of the plate-like member 12, before compressing the locking portion 24. When the non-corrugated section 52 is combined with the barbs 26 and/or the dimpled projections 48 to form the locking section 24, additional locking benefits are realized.

In a third principal type of embodiment, shown by example in FIGS. 11–14, a tenth fastener 62, such as a V-nail, is provided with corrugations 64. The corrugations 64 may extend longitudinally within the folded rectangular member 42 from the leading edge 18 to the trailing edge 20, as shown in the tenth fastener 62 of FIG. 11, or terminate short of the trailing edge at a pair of trailing outer ends 66, as shown in the eleventh fastener 68 of FIG. 12, to create a locking portion with a second non-corrugated section 70 between the trailing outer ends of the corrugations and the trailing edge of the eleventh fastener.

Figure 14:
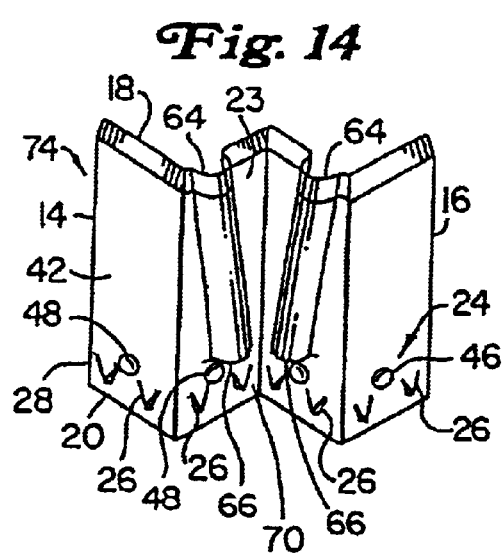
FIG. 14 is a perspective view of a V-nail having corrugations and a flat portion, with staggered rows of barbs and projections.

The non-corrugated section 70 may also contain one or more rows of projections, such as the row 46 of dimpled projections 48 shown in the twelfth fastener of FIG. 13, or the row of dimpled projections and the row 28 of barbs 26 staggered from one another, as shown in the thirteenth fastener 74 of FIG. 14.

It will be obvious to one skilled in the art that various alterations and combinations of the types of embodiments described above are possible, and all of these are contemplated by the present invention.

While various embodiments of the present improved fastener have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

What is claimed is:

1. A fastener for joining at least two wood pieces together, the fastener comprising:
   a plate-like member defined between a leading edge, a trailing edge, and first and second lateral edges, said leading edge being configured to enter the wood pieces before said trailing edge, wherein a longitudinal direction is defined as the direction extending from said leading edge toward said trailing edge;
   at least two corrugations formed on said plate-like member extending in a direction normal to said plate-like member and in said generally longitudinal direction, two of said at least two corrugations being obliquely angled with respect to said lateral edges so that a non-corrugated area disposed between and defined by said two corrugations tapers in said longitudinal direction; and
   a locking portion disposed on said plate-like member only in an area longitudinally closer to said trailing edge than to said leading edge for locking the fastener within the wood pieces.

2. The fastener of claim 1 wherein said locking portion includes at least one row of projections disposed at a lower one-third of said plate-like member towards said trailing edge, and configured to be at least partially compressed by the wood pieces when the fastener is driven into the wood pieces.

3. The fastener of claim 2 wherein said projections are barbs.

4. The fastener of claim 2 wherein said projections are dimpled.

5. The fastener of claim 1 wherein said locking portion comprises at least two rows of projections configured to be at least partially compressed by the wood pieces when the fastener is driven into the wood pieces, said at least two rows of projections being staggered from one another from said first lateral edge to said second lateral edge.

6. A fastener for joining at least two wood pieces together, the fastener comprising:
   a plate-like member defined between a leading edge and a trailing edge, said leading edge being configured to enter the wood pieces before said trailing edge, wherein a longitudinal direction is defined as the direction extending from said leading edge toward said trailing edge;

at least two corrugations formed on said plate-like member and extending in said generally longitudinal direction; and a locking portion disposed on said plate-like member near said trailing edge for locking the fastener within the wood pieces;

wherein said corrugations extend from said leading edge toward said trailing edge in said generally longitudinal direction and wherein said locking portion comprises a section of said plate-like member created by said corrugations terminating at a position longitudinally short of said trailing edge, so that said locking section is defined by an area between trailing outer ends of said corrugations and said trailing edge.

7. The fastener of claim 6 wherein said locking portion further comprises at least one row of projections.

8. The fastener of claim 7 wherein said projections comprise barbs.

9. The fastener of claim 7 wherein said projections are dimpled.

10. A fastener for joining at least two pieces of wood, comprising:

a folded rectangular member defined longitudinally between a leading edge and a trailing edge, and laterally between a first lateral edge and a second lateral edge; and a locking portion disposed on said folded rectangular member near said trailing edge for locking the fastener within the wood pieces being joined together by allowing portions of the wood pieces to compress onto at least a section of said locking portion for hindering withdrawal of the fastener from the wood pieces; and at least two corrugations formed on said folded rectangular member and extending in a generally longitudinal direction from said leading edge toward said trailing edge, for drawing portions of the wood pieces together as they are joined by the fastener;

wherein said corrugations extend from said leading edge toward said trailing edge in said generally longitudinal direction and wherein said locking portion comprises a section of said folded rectangular member created by said corrugations terminating at a position longitudinally short of said trailing edge, so that said locking section is defined by an area between trailing outer ends of said corrugations and said trailing edge.

11. The fastener of claim 10 wherein said locking portion further comprises at least one row of projections comprising at least one of barbs and dimpled projections.

12. A fastener for joining at least two pieces of wood, comprising:

a generally rectangular metal plate defined longitudinally between a leading edge and a trailing edge, and laterally between a first lateral edge and a second lateral edge, said metal plate including first and second divergent longitudinal portions to define a central portion generally V-shaped in profile, a third longitudinal portion divergently extending from said first portion to said first lateral edge, and a fourth longitudinal portion divergently extending from said second portion to said second lateral edge, wherein said first, second, third, and fourth portions are angled with respect to one another and define a generally W-shaped profile; and a plurality of projections disposed on at least one of the longitudinal portions in a lower one-third of said generally rectangular metal plate longitudinally toward said trailing edge for locking the fastener within the wood pieces to be joined by allowing portions of the wood pieces to compress onto at least one of said plurality of projections for hindering withdrawal of the fastener from the wood pieces; wherein said projections are disposed in the lower one-eighth of the fastener towards the trailing edge.

13. The fastener of claim 12 wherein each of the plurality of longitudinal portions is substantially flat except for said plurality of projections, and except for a bevel at the leading edge.

14. The fastener of claim 12 where at least one of said plurality of projections is disposed on each of the plurality of longitudinal portions.

15. The fastener of claim 14 wherein said plurality of projections form at least one row extending laterally across the fastener.

16. The fastener of claim 15 wherein said plurality of projections form at least two rows extending laterally across the fastener.

17. The fastener of claim 15 wherein each of said plurality of projections is substantially evenly spaced from one another laterally across the fastener.

18. The fastener of claim 12 wherein the fastener is a V-nail.

19. The fastener of claim 12 wherein said plurality of projections comprises barbs.

20. The fastener of claim 19 wherein the barbs are substantially triangular in shape and disposed so that the barbs extend longitudinally downwardly from a base towards the trailing edge to form a point.

21. The fastener of claim 20 wherein the barbs extend outwardly from said generally rectangular metal plate.

22. The fastener of claim 12 wherein said plurality of projections comprises substantially circular dimples.

23. A fastener for joining at least two pieces of wood, comprising:

a generally rectangular metal plate defined longitudinally between a leading edge and a trailing edge, and laterally between a first lateral edge and a second lateral edge, said metal plate including first and second divergent longitudinal portions to define a central portion generally V-shaped in profile, a third longitudinal portion divergently extending from said first portion to said first lateral edge, and a fourth longitudinal portion divergently extending from said second portion to said second lateral edge, wherein said first, second, third, and fourth portions are angled with respect to one another and define a generally W-shaped profile; and a plurality of projections disposed on at least one of the longitudinal portions in a lower one-third of said generally rectangular metal plate longitudinally toward said trailing edge for locking the fastener within the wood pieces to be joined by allowing portions of the wood pieces to compress onto at least one of said plurality of projections for hindering withdrawal of the fastener from the wood pieces; wherein said projections are disposed only in the lower one-third of the fastener towards the trailing edge.

24. A fastener for joining at least two pieces of wood, comprising:

a generally rectangular metal plate defined longitudinally between a leading edge and a trailing edge, and laterally between a first lateral edge and a second lateral edge, said generally rectangular metal plate having a plurality of folds extending from the leading edge to the trailing edge to define a generally W-shaped profile; and a plurality of projections disposed on the generally rectangular metal plate only in an area of said generally rectangular metal plate longitudinally closer to the trailing edge than to the leading edge.

25. The fastener of claim 24 wherein said plurality of projections comprises barbs containing a base and a point, and extending toward the trailing edge from the base to the point.

26. The fastener of claim 24 wherein said plurality of projections are disposed only in the lower one-third of said rectangular metal plate longitudinally toward said trailing edge.

27. A fastener for joining at least two pieces of wood, comprising:

a V-nail defined longitudinally between a leading edge and a trailing edge, and laterally between a first lateral edge and a second lateral edge, said V-nail including a plurality of projections disposed laterally across the fastener and longitudinally near the trailing edge for locking the fastener within the wood pieces to be joined by allowing portions of the wood pieces to compress onto at least a plurality of said plurality of projections for hindering withdrawal of the fastener from the wood pieces; wherein the plurality of projections are disposed only in an area longitudinally closer to the trailing edge than to the leading edge.

28. The fastener of claim 27 wherein the plurality of projections are disposed in at least one row extending laterally across said V-nail.

29. The fastener of claim 27 wherein the plurality of projections comprises at least one barbed projection.

* * * * *